(12) United States Patent
Wang et al.

(10) Patent No.: US 11,747,948 B2
(45) Date of Patent: Sep. 5, 2023

(54) LIGHT EMITTING SUBSTRATE, DISPLAY DEVICE AND FABRICATING METHOD

(71) Applicants: Hefei Xinsheng Optoelectronics Technology Co., Ltd., Anhui (CN); BOE Technology Group Co., Ltd., Beijing (CN)

(72) Inventors: Jie Wang, Beijing (CN); Zouming Xu, Beijing (CN); Jian Tian, Beijing (CN); Chunjian Liu, Beijing (CN); Xintao Wu, Beijing (CN); Jie Lei, Beijing (CN); Jianying Zhang, Beijing (CN)

(73) Assignees: Hefei Xinsheng Optoelectronics Technology Co., Ltd., Anhui (CN); BOE Technology Group Co., Ltd., Beijing (CN)

( * ) Notice: Subject to any disclaimer, the term of this patent is extended or adjusted under 35 U.S.C. 154(b) by 51 days.

(21) Appl. No.: 17/498,385

(22) Filed: Oct. 11, 2021

(65) Prior Publication Data
US 2022/0300114 A1   Sep. 22, 2022

(30) Foreign Application Priority Data
Mar. 22, 2021 (CN) .......................... 202110300196.6

(51) Int. Cl.
*G06F 3/044* (2006.01)
*G06F 3/041* (2006.01)

(52) U.S. Cl.
CPC ........ *G06F 3/0446* (2019.05); *G06F 3/04164* (2019.05); *G06F 2203/04103* (2013.01); *G06F 2203/04111* (2013.01)

(58) Field of Classification Search
CPC ............... G06F 3/0446; G06F 3/04164; G06F 2203/04103; G06F 2203/04111
(Continued)

(56) References Cited

U.S. PATENT DOCUMENTS

2010/0148679 A1* 6/2010 Chen ...................... H05B 45/46
315/297
2016/0204350 A1* 7/2016 Griffiths .............. H01L 51/0036
252/500
(Continued)

FOREIGN PATENT DOCUMENTS

CN        104598074 A    5/2015
CN        107526227 A   12/2017
(Continued)

OTHER PUBLICATIONS

CN202110300196.6 first office action.

*Primary Examiner* — Mark Edwards
(74) *Attorney, Agent, or Firm* — IPRO, PLLC

(57) ABSTRACT

The present disclosure relates to a light emitting substrate, a display device and a fabricating method. The substrate includes: a base substrate, and an electrode layer, a first insulating layer, a first wiring layer, a second insulating layer, a second wiring layer and light emitting elements sequentially located on a side of the base substrate; the electrode layer includes: a plurality of first touch control electrodes extending along a first direction; the first wiring layer includes: a plurality of driving signal wires extending along a second direction and configured to drive the light emitting elements to emit light, and a plurality of second touch control electrodes extending along the second direction, where the second touch control electrodes are insulated from the first touch control electrodes, and the second direction intersects with the first direction; and the second wiring layer includes: connection signal wires configured to connect different light emitting elements.

12 Claims, 7 Drawing Sheets

(58) Field of Classification Search
USPC .......................................................... 345/174
See application file for complete search history.

(56) References Cited

U.S. PATENT DOCUMENTS

| | | | |
|---|---|---|---|
| 2017/0269749 A1* | 9/2017 | Bok | G06F 3/0412 |
| 2018/0181250 A1* | 6/2018 | Kuo | G06F 3/0412 |
| 2020/0152707 A1* | 5/2020 | Won | H01L 27/3276 |
| 2022/0336537 A1* | 10/2022 | Chen | H01L 27/323 |

FOREIGN PATENT DOCUMENTS

| | | | | |
|---|---|---|---|---|
| CN | 111580702 A | | 8/2020 | |
| KR | 2017112318 A | * | 10/2017 | ......... G02F 1/13338 |

* cited by examiner

LIGHT EMITTING SUBSTRATE, DISPLAY DEVICE AND FABRICATING METHOD

CROSS-REFERENCE TO RELATED APPLICATIONS

The present disclosure claims priority to Chinese Patent Application No. 202110300196.6, filed with the China National Intellectual Property Administration on Mar. 22, 2021, the content of which is incorporated herein by reference in its entirety.

FIELD

The present disclosure relates to the technical field of semiconductors, and particularly to a light emitting substrate, a display device and a fabricating method.

BACKGROUND

Mini-LED backlight is a novel backlight display technology that subdivides backlight display regions to achieve a plurality of backlight zones, and can control each light region through a separate addressing power supply to achieve precise control of a display screen. Compared with traditional liquid crystal display products, ultra-small pitch LED products can achieve local dimming in a smaller region, better brightness uniformity, higher color contrast, and thinner product appearance.

With the demand for remote office and distance education, the market demand for conference tablets or education tablets that integrate writing, display, and collaboration functions continues to increase, and an electromagnetic touch control technology (EMR technology) adopted by products currently used in business and distance education scenarios has high touch control accuracy and is close to real hand writing in writing experience, so that the products are more popular in the market. However, traditional electromagnetic touch control products need to add an independent electromagnetic board behind a back panel of a display module. The cost of a current electromagnetic board is relatively high, and a product adopting an external electromagnetic touch control solution cannot achieve lightness and thinness as a whole.

SUMMARY

The present disclosure provides a light emitting substrate, a display device and a fabricating method.

An embodiment of the present disclosure provides a light emitting substrate, including: a base substrate, and an electrode layer, a first insulating layer, a first wiring layer, a second insulating layer, a second wiring layer and light emitting elements sequentially located on a side of the base substrate; the electrode layer includes: a plurality of first touch control electrodes extending along a first direction; the first wiring layer includes: a plurality of driving signal wires extending along a second direction and configured to drive the light emitting elements to emit light, and a plurality of second touch control electrodes extending along the second direction, where the second touch control electrodes are insulated from the first touch control electrodes, and the second direction intersects with the first direction; and the second wiring layer includes: connection signal wires configured to connect different light emitting elements.

An embodiment of the present disclosure further provides a display device, including the light emitting substrate provided by an embodiment of the present disclosure, and further including a display panel located on a side of the light emitting substrate.

An embodiment of the present disclosure further provides a fabricating method for fabricating the light emitting substrate provided by embodiment of the present disclosure. The fabricating method includes: providing the base substrate; forming the electrode layer on a side of the base substrate through an electroplating process, where the electrode layer includes the plurality of first touch control electrodes extending along the first direction; forming the first insulating layer on a side of the first electrodes facing away from the base substrate through a patterning process; forming the first wiring layer on a side of the first insulating layer facing away from the first touch control electrodes through the electroplating process, where the first wiring layer includes: the plurality of driving signal wires extending along the second direction, and the plurality of second touch control electrodes extending along the second direction; forming the second insulating layer on a side of the first wiring layer facing away from the first insulating layer through the patterning process; and forming the second wiring layer on a side of the second insulating layer facing away from the first wiring layer, where the second wiring layer includes the connection signal wires configured to connect different light emitting elements.

DETAILED DESCRIPTION

In order to make objectives, technical solutions, and advantages of embodiments of the present disclosure clearer, the technical solutions of embodiments of the present disclosure will be described clearly and completely in conjunction with the accompanying drawings of embodiments of the present disclosure. Obviously, the described embodiments are part of embodiments of the present disclosure, rather than all of embodiments. Based on the described embodiments of the present disclosure, all other embodiments obtained by those of ordinary skill in the art without creative labor fall within the protection scope of the present disclosure.

Unless otherwise defined, technical terms or scientific terms used in the present disclosure shall have common meanings understood by those of ordinary skilled in the art to which the present disclosure belongs. "First", "second" and similar words used in the present disclosure do not indicate any order, quantity or importance, but are only used to distinguish different components. "Include" or "comprise" and other similar words mean that elements or items appearing before the word covers the elements or items listed after the word and its equivalents, but does not exclude other elements or items. Similar words such as "connected" or "linked" are not limited to physical or mechanical connections, but may include electrical connections, whether direct or indirect. "Upper", "lower", "left", "right", etc. are only used to indicate a relative position relationship. When an absolute position of a described object changes, the relative position relationship may also change accordingly.

In order to keep the following description of embodiments of the present disclosure clear and concise, the present disclosure omits detailed descriptions of known functions and known components.

Figure 1:
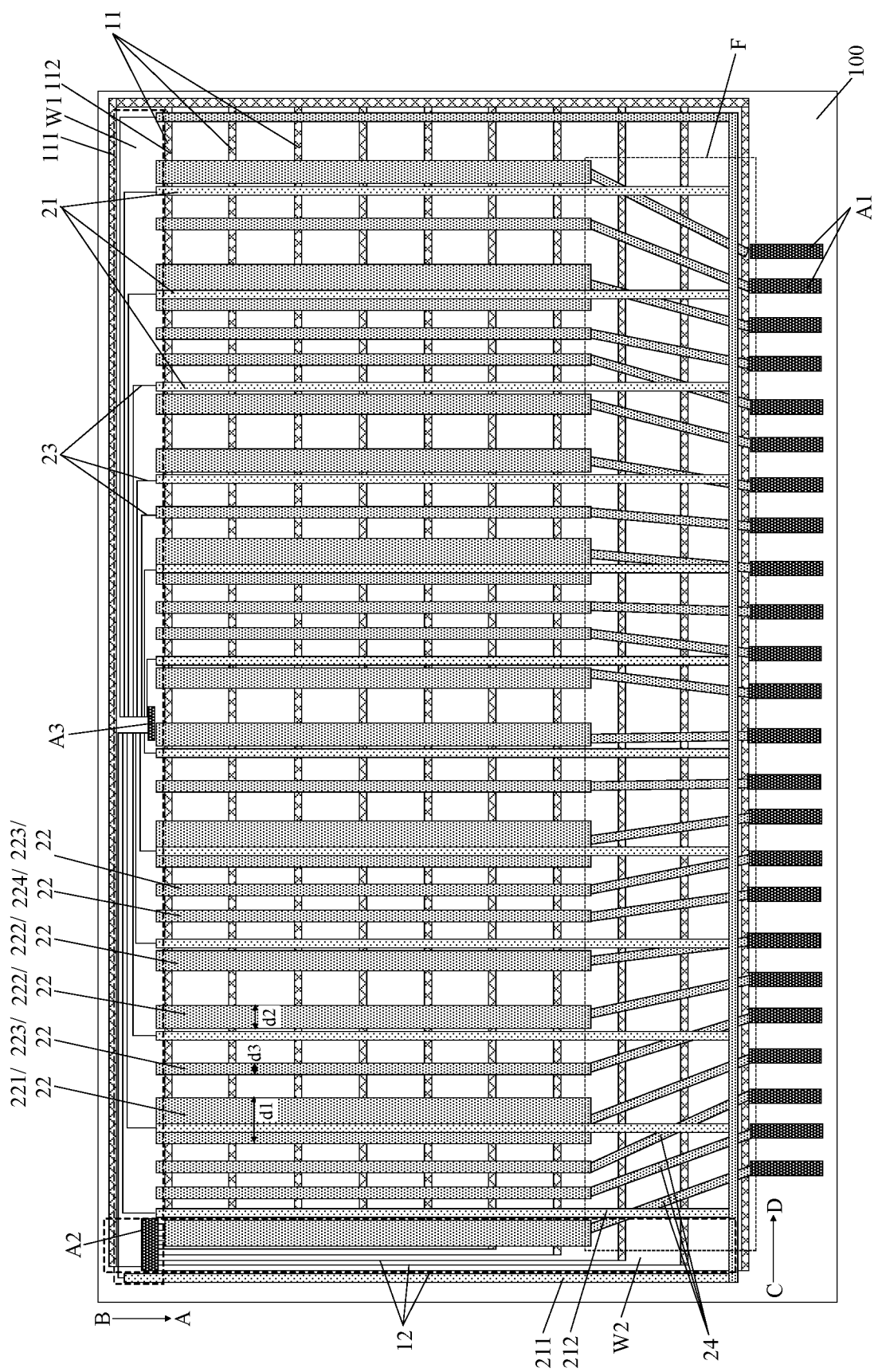
FIG. 1 is a top view schematic diagram of a light emitting substrate provided by an embodiment of the present disclosure.
Figure 2:
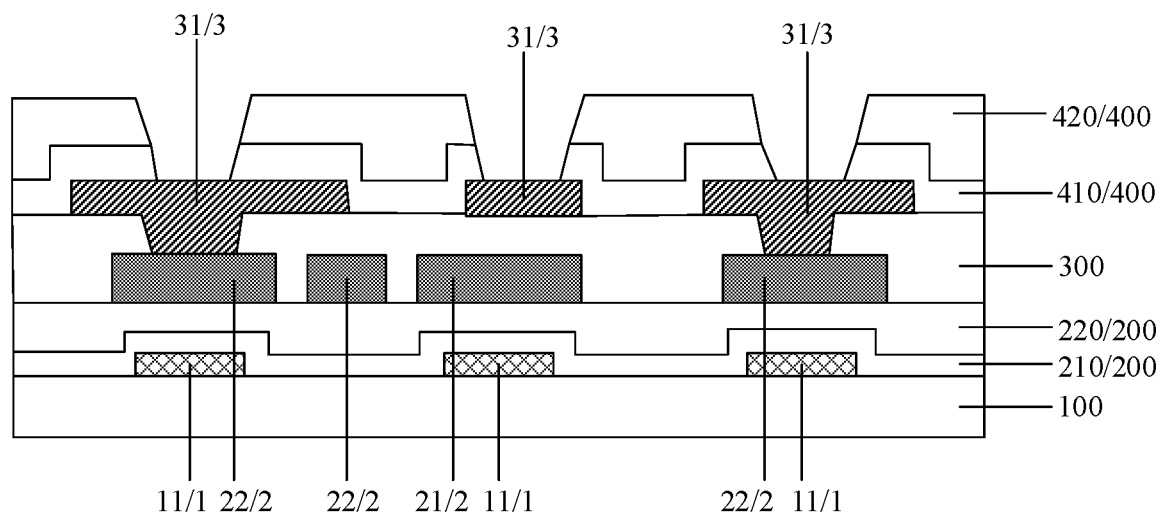
FIG. 2 is a sectional schematic diagram of a light emitting substrate provided by an embodiment of the present disclosure.
Figure 3:
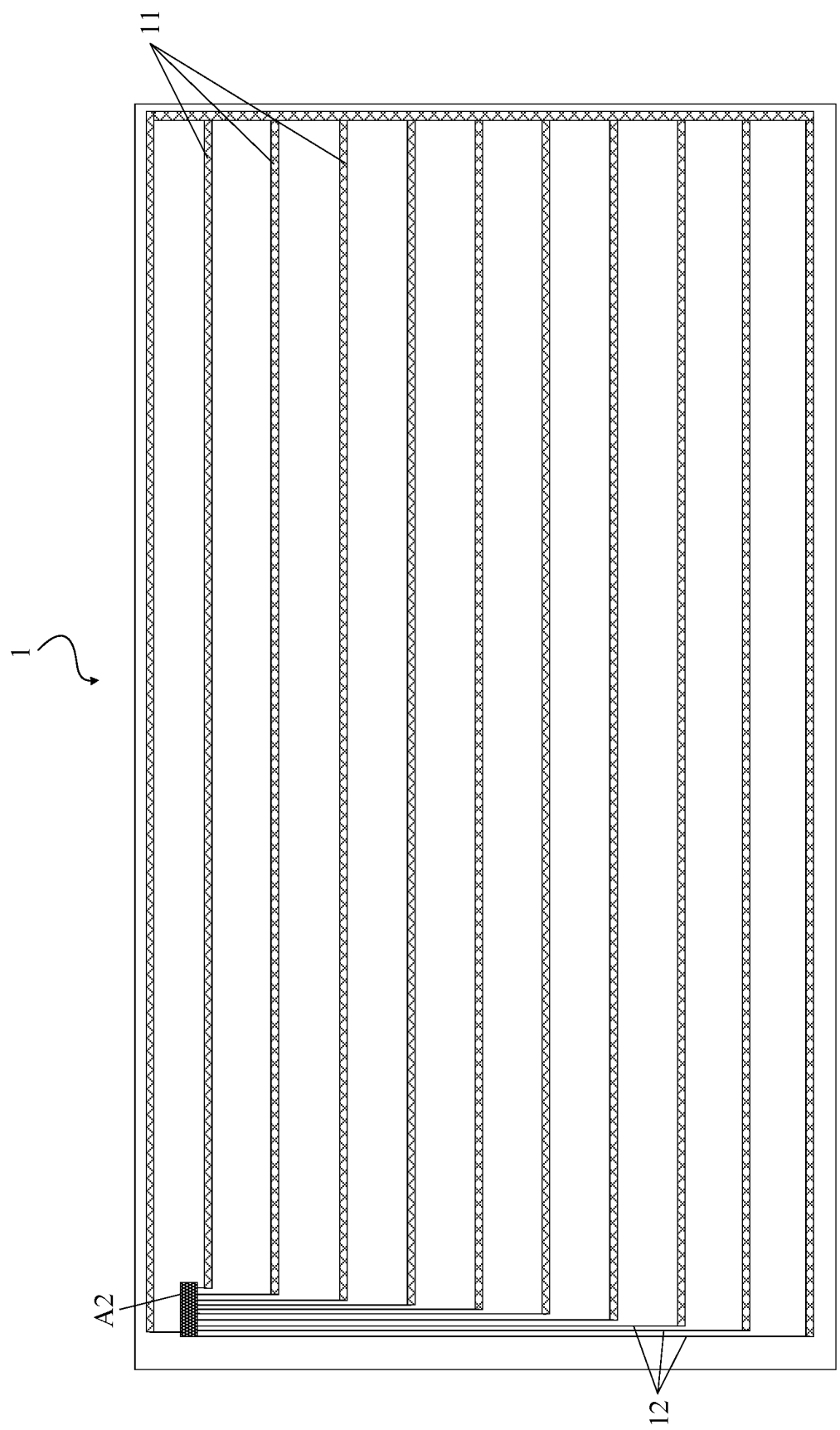
FIG. 3 is a schematic diagram of an electrode layer provided by an embodiment of the present disclosure.
Figure 4:
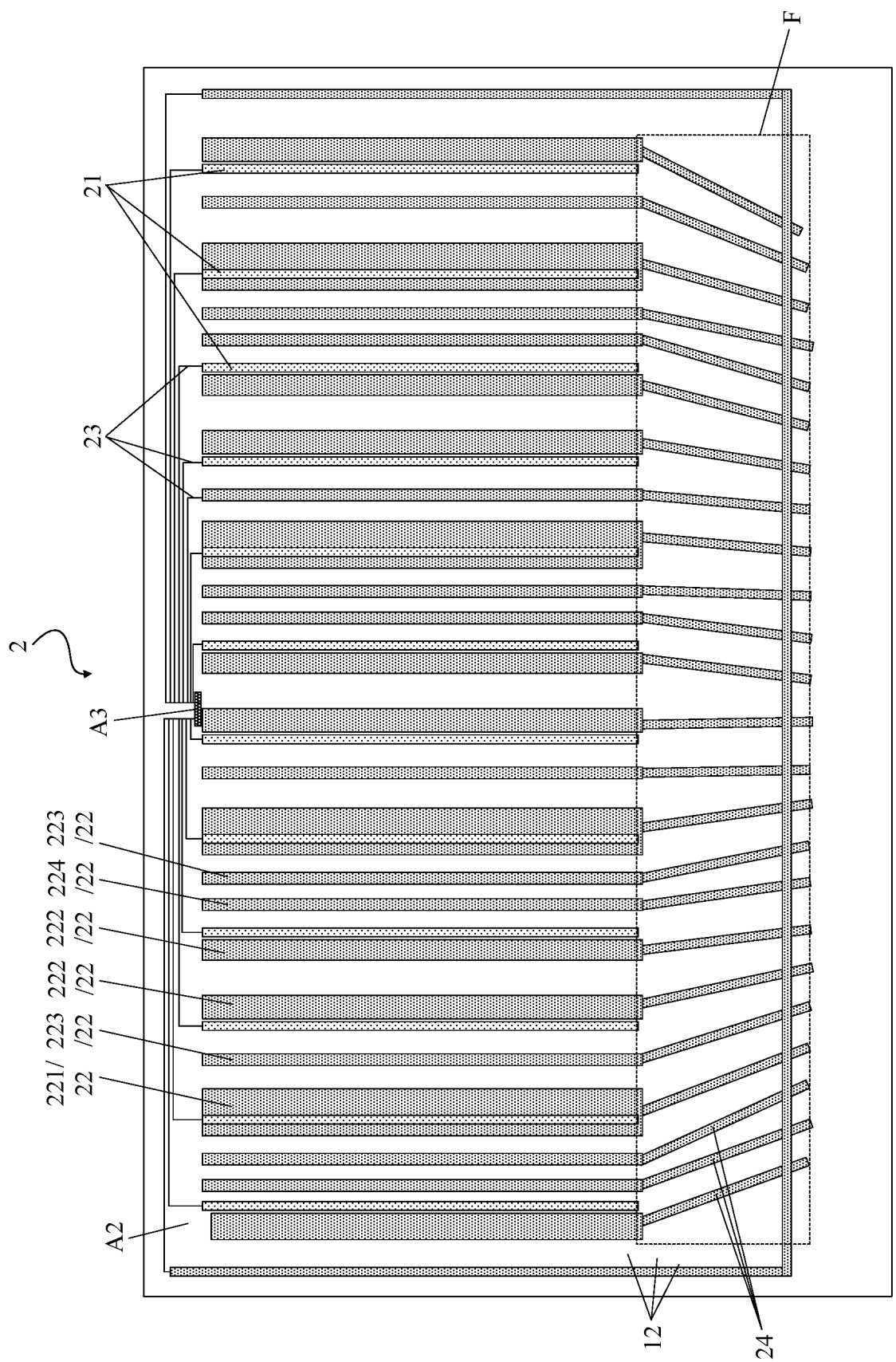
FIG. 4 is a schematic diagram of a first wiring layer provided by an embodiment of the present disclosure.
Figure 5:
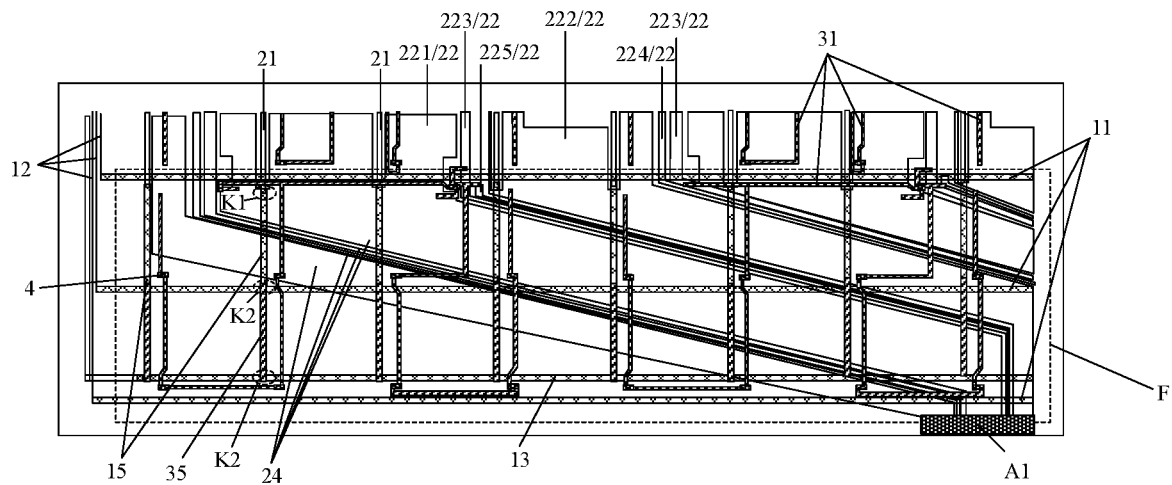
FIG. 5 is a locally-amplified schematic diagram of a light emitting substrate provided by an embodiment of the present disclosure.
Figure 6:
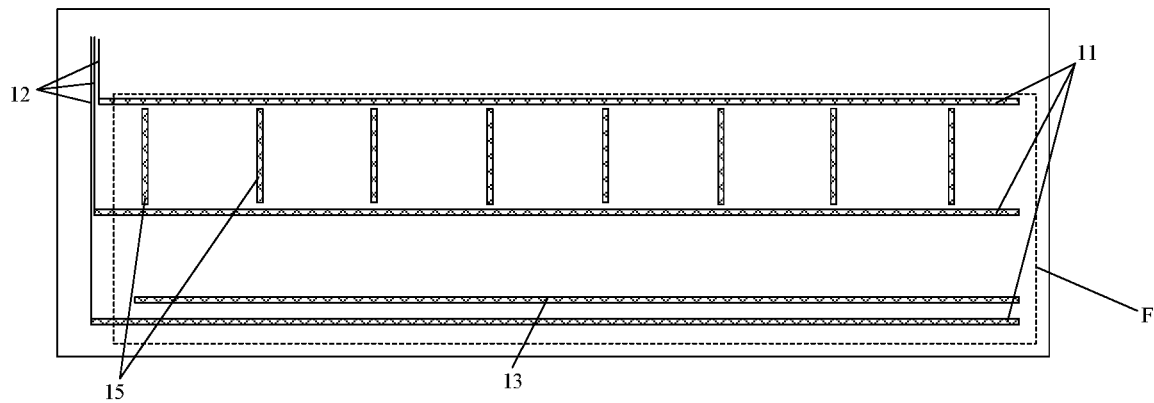
FIG. 6 is a schematic diagram of a single film layer of an electrode layer in FIG. 5.
Figure 7:
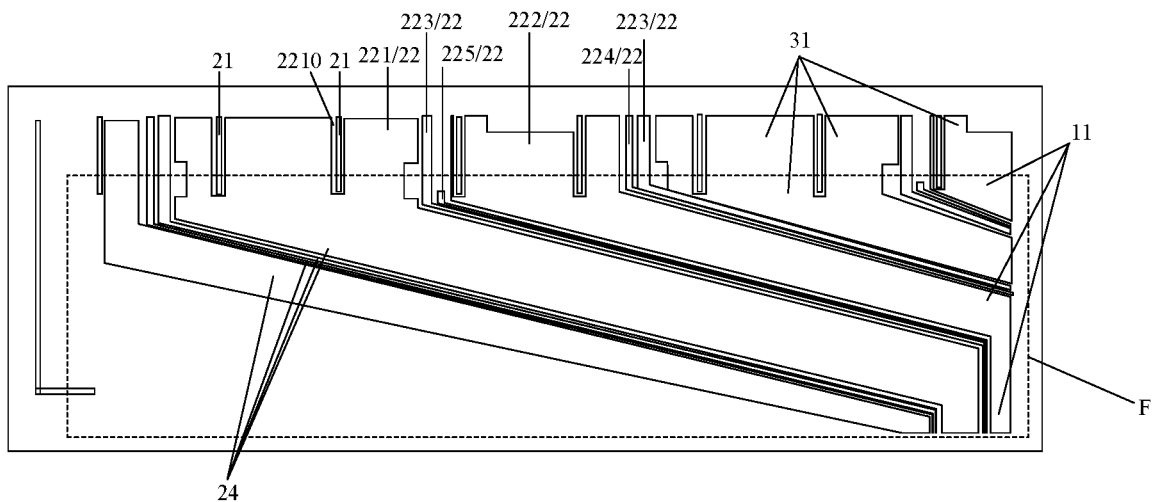
FIG. 7 is a schematic diagram of a single film layer of a first wiring layer in FIG. 5.
Figure 8:
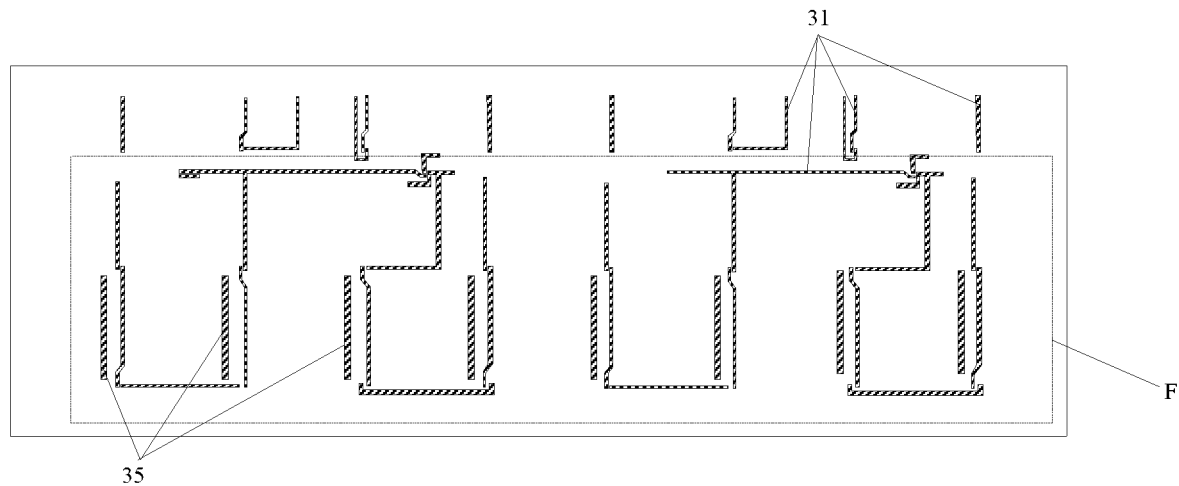
FIG. 8 is a schematic diagram of a single film layer of a second wiring layer in FIG. 5.

With reference to FIG. 1 to FIG. 8, in order to clearly illustrate a film layer diagram of a light emitting substrate, FIG. 1 is a schematic diagram including an electrode layer and a first wiring layer; FIG. 2 is a cross-sectional view of a light emitting substrate; FIG. 3 is a film layer diagram including the electrode layer in FIG. 1; FIG. 4 is a film layer diagram including the first wiring layer in FIG. 1; FIG. 5 is a locally-amplified diagram of a light emitting substrate; FIG. 6 is a film layer diagram including an electrode layer in FIG. 5; FIG. 7 is a single film layer diagram including a first wiring layer in FIG. 5; and FIG. 8 is a film layer diagram of a second wiring layer in FIG. 5. The light emitting substrate includes: a base substrate 100, and an electrode layer 1, a first insulating layer 200, a first wiring layer 2, a second insulating layer 300, a second wiring layer 3 and light emitting elements 4 sequentially located on a side of the base substrate.

The electrode layer 1 includes: a plurality of first touch control electrodes 11 extending along a first direction (a transverse direction in FIG. 1).

The first wiring layer 2 includes: a plurality of driving signal wires 22 extending along a second direction (a longitudinal direction in FIG. 1) and configured to drive the light emitting elements 4 to emit light, and a plurality of second touch control electrodes 21 extending along the second direction (the longitudinal direction in FIG. 1). The second touch control electrodes 21 are insulated from the first touch control electrodes 11, and the second direction intersects with the first direction.

The second wiring layer 3 includes: connection signal wires 31 configured to connect different light emitting elements 4.

In an embodiment of the present disclosure, the electrode layer 1 includes the first touch control electrodes 11; the first wiring layer 2 includes the driving signal wires 22 configured to drive the light emitting elements 4 to emit light, and the second touch control electrode 21; the second wiring layer 3 includes the connection signal wires 31 configured to connect the different light emitting elements 4 to realize the integration of an electromagnetic touch control function on the light emitting substrate, thereby improving the problems that for an electromagnetic touch product of the related art, it is necessary to add an independent electromagnetic board behind a back panel of a display module, so that the cost is high, and lightness and thinness cannot be achieved.

In some embodiments, as shown in FIG. 2, a third insulating layer 400 may be further arranged on a side of the second wiring layer 3 facing away from the second insulating layer 300. The first insulating layer 200 may include a first passivation layer 210 and a first light-sensitive glue layer 220 located on a side of the first passivation layer 210 away from the electrode layer 1; the third insulating layer 400 may include a third passivation layer 410 and a third light-sensitive glue layer 420 located on a side of the third passivation layer 410 facing away from the first wiring layer 2.

Figure 9:
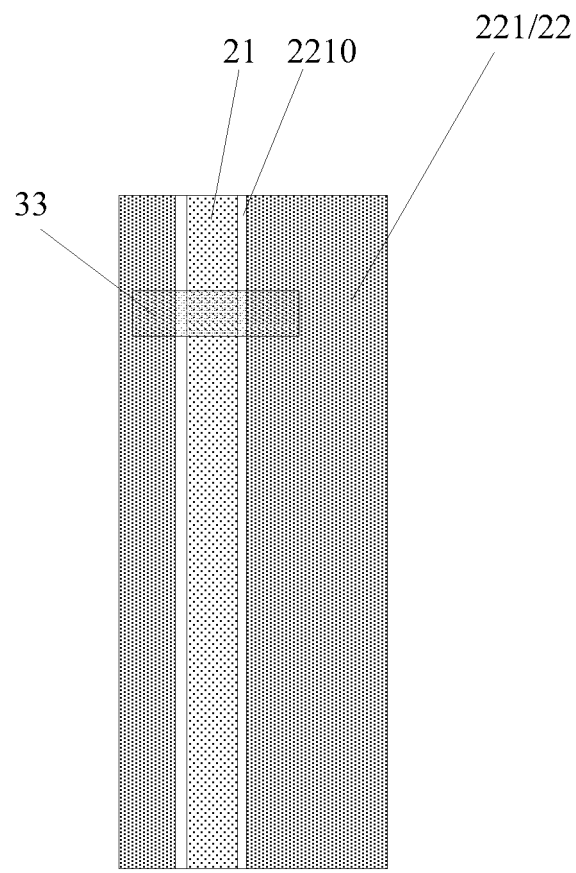
FIG. 9 is a locally-amplified schematic diagram of a driving signal wire provided with a second touch control electrode.

In some embodiments, as shown in FIG. 5, FIG. 7, and FIG. 9, FIG. 9 is a locally-amplified schematic diagram of a driving signal wire 22 provided with a second touch control electrode 21. At least a part of the driving signal wires 22 have hollowed-out regions 2210 extending along the second direction (the longitudinal direction in FIG. 1), and at least a part of the second touch control electrodes 21 are located in the hollowed-out regions 2210. In an embodiment of the present disclosure, by arranging the hollowed-out regions 2210 of the driving signal wires 22 and arranging the second touch control electrodes 21 in the hollowed-out regions 2210, a part of the second touch control electrodes 21 may be integrated into the existing first wiring layer 2 of the light emitting substrate, and film production for the light emitting substrate may be reduced.

In some embodiments, as shown in FIG. 9, the light emitting substrate further includes a bridging electrode 33; and two portions of the same driving signal wire 22 at two sides of the hollowed-out region 2210 are connected through the bridging electrode 33. In some embodiments, the same driving signal wire 22 divided by the hollowed-out region 2210 may be connected through the bridging electrode 33 at one end of the driving signal wire 22 (for example, an end of the driving signal wire 22 away from a fanout region F).

In some embodiments, the bridging electrode 33 is located on the second wiring layer 3 and is fabricated on a same layer as the connection signal wires 31. In an embodiment of the present disclosure, the bridging electrode 33 is located on the second wiring layer 3, so that the quantity of film layers of the light emitting substrate may be reduced, and a fabricating process of the light emitting substrate may be simplified.

In some embodiments, as shown in FIG. 1, FIG. 4, FIG. 5, and FIG. 7, the driving signal wires 22 include a first power supply voltage signal wire 221, a second power supply voltage signal wire 222, and an input signal wire (which may specifically include a first input signal wire 223 and a second input signal wire 224). In some embodiments, the driving signal wires 22 may further include a recovery wire 225. A width d1 of the first power supply voltage signal wire 221 in the first direction is larger than a width d3 of the input signal wire (for example, the first input signal wire 223) in the first direction, a width d2 of the second power supply voltage signal wire 222 in the first direction is larger than the width d3 of the input signal wire (for example, the first input signal wire 223) in the first direction, and the first power supply signal wires 221 and/or the second power supply voltage signal wire 222 have one of the hollowed-out regions 2210. In some embodiments, the hollowed-out regions 2210 may only be arranged for the first power supply signal wire 221. In an embodiment of the present disclosure, since the wire widths of the first power supply voltage signal wire 221 and the second power supply voltage signal wire 222 are relatively wide, one of the hollowed-out regions 2210 is arranged for the first power supply signal wire 221 and/or the second power supply voltage signal wire 222, so that influence on pressure drop changes of the first power supply signal wire 221 and the second power supply voltage signal wire 222 is relatively small.

In some embodiments, the first power supply voltage signal wire 221 may be a ground wire (GND wire), and the second power supply voltage signal wire 222 may be a VLED signal wire which provides a voltage signal for light emitting regions and drives the light emitting element 4 to light up. The first input signal wire 223 may be a power supply signal wire PWR, and the second input signal wire 224 may be an addressing signal wire ADDR. Through controlling an internal logic of a chip (IC), brightness and darkness of the light emitting elements 4 in each of the light emitting regions are controlled; and the recovery line 225 may be a recovery line of the addressing signal wire ADDR.

In some embodiments, as shown in FIG. 1, FIG. 3, FIG. 4, FIG. 5, and FIG. 7, the light emitting substrate further includes first fanout wires 24 in a one-to-one correspondence with the driving signal wires 22; and one ends of the first fanout wires 24 are connected with the driving signal wires 22, and the other ends of the first fanout wires 24 are connected to first terminals A1. The light emitting substrate further includes second fanout wires 12 in a one-to-one correspondence with the first touch control electrodes 11, and third fanout wires 23 in a one-to-one correspondence with the second touch control electrodes 21, where one ends of the second fanout wires 12 are connected with the first touch control electrodes 11, the other ends of the second fanout wires 12 are connected to second terminals A2, one ends of the third fanout wires 23 are connected with the second touch control electrodes 21, the other ends of the third fanout wires 23 are connected to third terminals A3, and the second terminals A2 and the third terminals A3 are located on a same side of the base substrate.

In some embodiments, as shown in FIG. 1, the first terminals A1 and the second terminals A2 are located at different sides of the base substrate 100 in a direction parallel to a surface of base substrate 100 facing the electrode layer 1. For example, as shown in FIG. 1, the first terminals A1 are located on a lower side of the base substrate 100, and the second terminals A2 are located on an upper side of the base substrate 100. In an embodiment of the present disclosure, the first terminals A1 and the second terminals A2 are located on different sides of the base substrate 100, that is, the first fanout wires 24, the second fanout wires 12, and the third fanout wires 23 are respectively located in different regions. Therefore, it is avoided that when the first terminals A1, the second terminals A2, and the third terminals A3 are at a same side of the base substrate, the fanout region F (the region where the first fanout wires 24 are located is set as the fanout region F), the electrode layer 1, the first wiring layer 2, and the second wiring layer 3 are stacked, so that an overlapping area of orthographic projections of different layers of wiring on the base substrate 100 in this region is large, resulting in a high-frequency signal wire short circuit (for example, Data Gate short, DGS) risk (Due to the fact that a material of the wiring layers is generally metal, and there is a voltage difference between two layers of metal wiring, when an overlapping area of orthographic projections of the two is large, a pressure difference at the overlapping region may cause metal growth to pierce the insulating layer, and eventually make different layers of metal contact each other, causing a short circuit).

In some embodiments, as shown in FIG. 1, the first terminals A1 and the second terminals A2 are located on opposite sides of the base substrate 100; a direction pointing from a side where the second terminals A2 are located to a side where the first terminals A1 are located is set as a first pointing direction AB, a region between a first piece of the first touch control electrodes 111 and a second piece of the first touch control electrodes 112 in the first pointing direction AB is set as a first touch control inactive region W1, and an orthographic projection of the first touch control inactive region W1 on the base substrate 100 covers a region where the third fanout wires 23 are located. In an embodiment of the present disclosure, by arranging the third fanout wires 23 of the second touch control electrodes 21 in the first touch control inactive region W1 between the first piece of the first touch control electrodes 111 and the second piece of the first touch control electrodes 112, while a frame of the light emitting substrate is compressed, an inactive edge electromagnetic channel is effectively utilized (that is, an outermost region is particularly susceptible to electromagnetic signals in an environment, in order to ensure a touch control function of a main region in a plane, an edge touch control inactive region is specially set to isolate the interference of the electromagnetic signals in the environment), a wiring design of the third fanout wires 23 is completed, and there is no need to separately design a wiring space for the third fanout wires 23, which is beneficial to realize frame narrowing of a display device.

In some embodiments, as shown in FIG. 1, a region between a first piece of the second touch control electrodes 211 and a second piece of the second touch control electrodes 212 in a direction (a direction pointed by arrow CD in FIG. 1) perpendicular to the first pointing direction AB and pointing from the side where the second terminals A2 are located to an opposite side is set as a second touch control inactive region W2, and an orthographic projection of the second touch control inactive region W2 on the base substrate covers a region where the second fanout wires 12 are located. In an embodiment of the present disclosure, by arranging the second fanout wires 12 of the first touch control electrodes 11 in the second touch control inactive region W2 between the first piece of the second touch control electrodes 211 and the second piece of the second touch control electrodes 212, while the frame of the light emitting substrate is compressed, the inactive edge electromagnetic channel is effectively utilized, a wiring design of the second fanout wires 12 is completed, and there is no need to separately design a wiring space for the second fanout wires 12, which is beneficial to realize frame narrowing of the display device.

In summary, the above design not only effectively utilizes the inactive edge electromagnetic channel, but also saves an electromagnetic wiring space in a surface of the light emitting substrate, and effectively increases an electromagnetic touch control area. Compared with a conventional design, a frame size is effectively compressed and capabilities of a narrow frame product are achieved.

In some embodiments, as shown in FIG. 1, FIG. 5 and FIG. 6, the electrode layer 1 further includes a plurality of first extension parts 15 which are located in a fanout region F, extend along the second direction (the longitudinal direction in FIG. 1, FIG. 5 and FIG. 6) and are in a one-to-one correspondence with the second touch control electrodes 21, and the first extension parts 15 are connected with the second touch control electrodes 21 through via holes (such as via holes K1 in FIG. 5) penetrating the first insulating layer to prolong the second touch control electrodes 21. In some embodiments, as shown in FIG. 1, FIG. 5 and FIG. 8, FIG. 8 is a film layer diagram of the second wiring layer 3 in FIG. 5. The second wiring layer 3 further includes a plurality of second extension parts 35 which are located in the fanout region F, extend along the second direction (the longitudinal direction in FIG. 1, FIG. 5 and FIG. 8) and are in a one-to-one correspondence with the first extension parts 15, and the second extension parts 35 are connected with the first extension parts 15 through via holes (such as via holes K2 in FIG. 5) penetrating the second insulating layer to prolong the second touch control electrodes 21. Limited by a wiring pattern design of the fanout region F, the second touch control electrodes 21 may only cover a starting point of the fanout region F. In an embodiment of the present disclosure, a design of two kinds of via holes is adopted. At tail ends of the original second touch control electrodes 21, the first extension parts 15 of the electrode layer 1 are used to prolong the second touch control electrodes 21. When the first extension parts 15 intersect with the first touch control electrodes 21, the second extension parts 35 of the third wiring layer 3 are further used to prolong the second touch control electrodes 21. Therefore, a wiring range of the second touch control electrodes 21 is extended to an upper side of the first terminals A1, a touch control range of electromagnetic touch control is further expanded, and an edge touch control performance of electromagnetic touch control and a backlight structure is guaranteed.

In some embodiments, as shown in FIG. 1, FIG. 5 and FIG. 6, the electrode layer 1 further includes a plurality of second touch electrode connecting wires 13 extending in the first direction, located in the fanout region F and connecting one ends of different second touch electrodes 21. In some embodiments, one ends of the second extension parts 35 of all the second touch electrodes 21 are connected.

In some embodiments, as shown in FIG. 5, the light emitting substrate includes a plurality of light emitting units, at least one of the light emitting units is provided with the plurality of light emitting elements 4, and the plurality of light emitting elements 4 of the same light emitting unit are connected in series through the connection signal wires 31.

In some embodiments, materials of the electrode layer 1, the first wiring layer 2, and the second wiring layer 3 may be copper.

In some embodiments, each of the light emitting elements 4 may be a mini-LED or a micro-LED.

An embodiment of the present disclosure further provides a display device, including the light emitting substrate provided by an embodiment of the present disclosure, and further including a display panel located on a side of the light emitting substrate.

Figure 10:
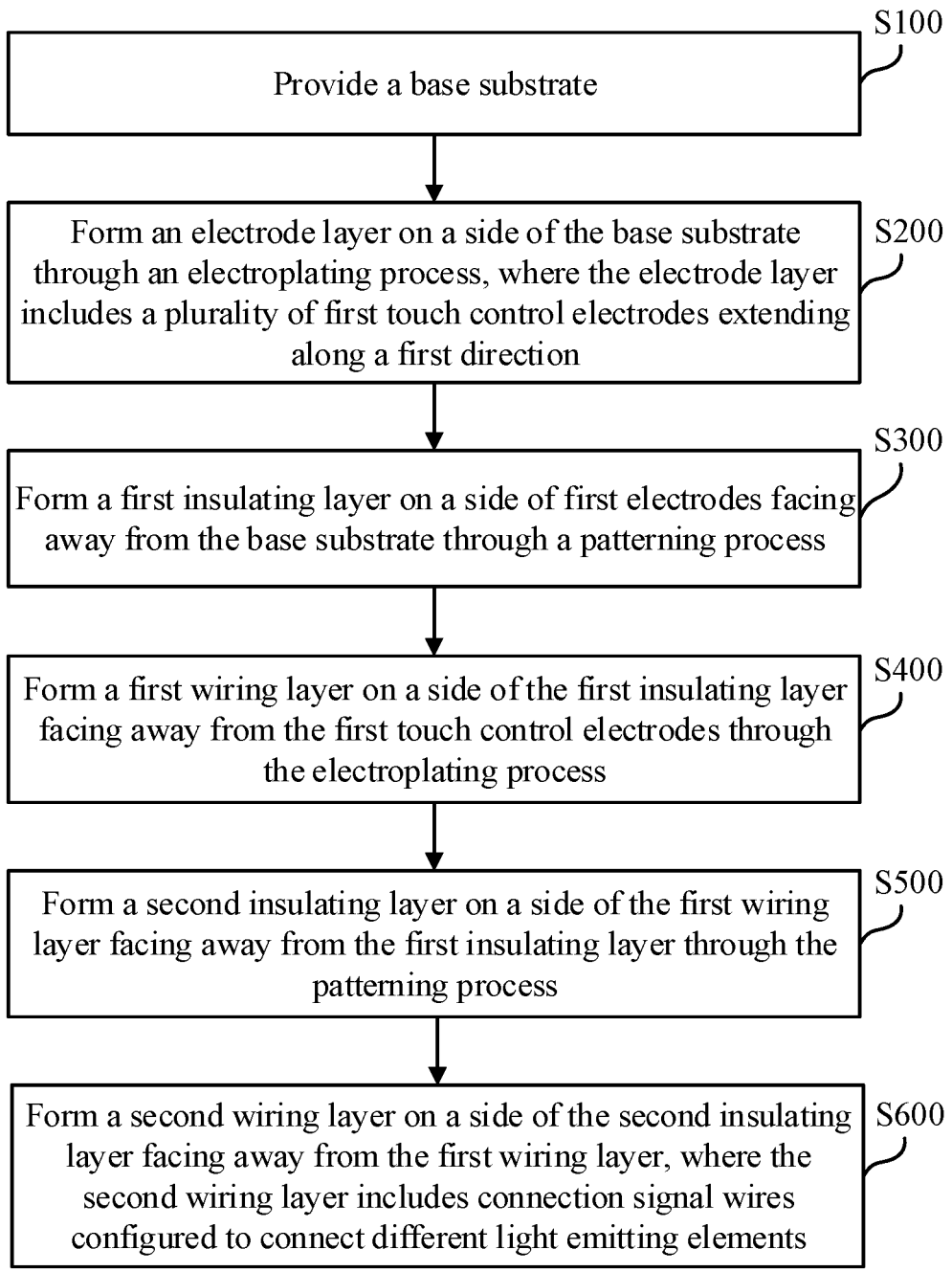
FIG. 10 is a fabricating flow chart of a light emitting substrate provided by an embodiment of the present disclosure.

As shown in FIG. 10, an embodiment of the present disclosure further provides a fabricating method for fabricating the light emitting substrate provided by an embodiment of the present disclosure. The fabricating method includes the following steps.

Step S100, a base substrate is provided.

Step S200, an electrode layer is formed on a side of the base substrate through an electroplating process, where the electrode layer includes a plurality of first touch control electrodes extending along a first direction.

Step S300, a first insulating layer is formed on a side of first electrodes facing away from the base substrate through a patterning process. In some embodiments, the first insulating layer may include a first passivation layer and a first light-sensitive glue layer.

Step S400, a first wiring layer is formed on a side of the first insulating layer facing away from the first touch control electrodes through the electroplating process, where the first wiring layer includes: a plurality of driving signal wires extending along a second direction, and a plurality of second touch control electrodes extending along the second direction.

Step S500, a second insulating layer is formed on a side of the first wiring layer facing away from the first insulating layer through the patterning process, where the second insulating layer may include a second passivation layer and a second light-sensitive glue layer.

Step S600, a second wiring layer is formed on a side of the second insulating layer facing away from the first wiring layer, where the second wiring layer includes connection signal wires configured to connect different light emitting elements. In some embodiments, the step that the second wiring layer is formed on the side of the second insulating layer facing away from the first wiring layer may include: the second wiring layer is formed on the side of the second insulating layer facing away from the first wiring layer through processes of sputtering, cleaning, coating, baking, photoetching, developing, hard baking, etching, and stripping.

In some embodiments, a process implementation solution of the light emitting substrate may include the following steps.

Step 1, a Cu0 layer, i.e., the electrode layer 1, is fabricated through an electroplating process. The electrode layer 1 includes the plurality of first touch control electrodes (electromagnetic Sensor X electrodes).

Step 2, a PVX0 layer is fabricated through a sputtering process as the first passivation layer.

Step 3, an OC0 layer is fabricated through processes of coating, photoetching and developing as the first light-sensitive glue layer.

Step 4, a Cu1 layer is fabricated on the OC0 layer through the electroplating process as the first wiring layer 2 which includes the second touch control electrodes 21 (electromagnetic Sensor Y electrodes) and the driving signal wires 22 (mini-LED backlight signal wires).

Step 5, a PVX1 layer is fabricated through the sputtering process as the second passivation layer.

Step 6, an OC1 layer is fabricated above the Cu1 layer as the second light-sensitive glue layer through the processes of coating, photoetching and developing.

Step 7, a Cu2 layer is fabricated above the OC1 layer as the second wiring layer 3 through the processes of sputtering, cleaning, coating, baking, photoetching, developing, hard baking, etching, and stripping.

Step 8, a PVX2 layer is fabricated through the sputtering process as the third passivation layer.

Step 9, an OC2 layer is fabricated above the PVX2 layer as the third passivation layer through the processes of coating, photoetching and developing.

Step 10, PVX layers at an opening of the OC2 layer are etched through a dry etching process using the OC2 layer as a retaining wall.

Step 11, the light emitting elements are bonded.

Embodiments of the present disclosure have the beneficial effects as follows: in embodiments of the present disclosure, the electrode layer 1 includes the first touch control electrodes 11; the first wiring layer 2 includes the driving signal wires 22 configured to drive the light emitting elements 4 to emit light, and the second touch control electrodes 21; and the second wiring layer 3 includes the connection signal wires 31 configured to connect the different light emitting elements 4 to realize the integration of the electromagnetic touch control function on the light emitting substrate, thereby improving the problems that for the electromagnetic touch product of the related art, it is necessary to add the independent electromagnetic board behind the back panel of the display module, so that the cost is high, and the lightness and the thinness cannot be achieved.

Obviously, those of skill in the art can make various modifications and variations to the present disclosure without departing from the spirit and scope of the present disclosure. In this way, if these modifications and variations of the present disclosure fall within the scope of the claims of the present disclosure and their equivalent technologies, the present disclosure is also intended to include these modifications and variations.

What is claimed is:

1. A light emitting substrate, comprising: a base substrate, and an electrode layer, a first insulating layer, a first wiring layer, a second insulating layer, a second wiring layer and light emitting elements sequentially located on a side of the base substrate; wherein
   the electrode layer comprises: a plurality of first touch control electrodes extending along a first direction;
   the first wiring layer comprises: a plurality of driving signal wires extending along a second direction and configured to drive the light emitting elements to emit light, and a plurality of second touch control electrodes extending along the second direction, wherein the second touch control electrodes are insulated from the first touch control electrodes, and the second direction intersects with the first direction; and
   the second wiring layer comprises: connection signal wires configured to connect different light emitting elements;
   wherein the light emitting substrate further comprises first fanout wires in a one-to-one correspondence with the driving signal wires, one ends of the first fanout wires are connected with the driving signal wires, and the other ends of the first fanout wires are connected to first terminals; and
   the light emitting substrate further comprises second fanout wires in a one-to-one correspondence with the first touch control electrodes, and third fanout wires in a one-to-one correspondence with the second touch control electrodes, wherein one ends of the second fanout wires are connected with the first touch control electrodes, the other ends of the second fanout wires are connected to second terminals, one ends of the third fanout wires are connected with the second touch control electrodes, the other ends of the third fanout wires are connected to third terminals, and the second terminals and the third terminals are located on a same side of the base substrate;
   wherein the first terminals and the second terminals are located on opposite sides of the base substrate; and
   a direction pointing from a side where the second terminals are located to a side where the first terminals are located is set as a first pointing direction, a region between a first piece of the first touch control electrodes and a second piece of the second touch control electrodes in the first pointing direction is set as a first touch control inactive region, and an orthographic projection of the first touch control inactive region on the base substrate covers a region where the third fanout wires are located.

2. The light emitting substrate according to claim 1, wherein at least a part of the driving signal wires have hollowed-out regions extending along the second direction; and
   at least a part of the second touch control electrodes are located in the hollowed-out regions.

3. The light emitting substrate according to claim 2, wherein the light emitting substrate further comprises a bridging electrode; and two portions of a same driving signal wire at two sides of one of the hollowed-out regions are connected through the bridging electrode.

4. The light emitting substrate according to claim 3, wherein the bridging electrode is located on the second wiring layer.

5. The light emitting substrate according to claim 2, wherein the driving signal wires comprises a first power supply voltage signal wire, a second power supply voltage signal wire and an input signal wire, wherein a width of the first power supply voltage signal wire in the first direction is larger than a width of the input signal wire in the first direction, and a width of the second power supply voltage signal wire in the first direction is larger than a width of the input signal wire in the first direction; and
   the first power supply voltage signal wire and/or the second power supply voltage signal wire have one of the hollowed-out regions.

6. The light emitting substrate according to claim 1, wherein a region between a first piece of the second touch control electrodes and a second piece of the second touch control electrodes on a direction perpendicular to the first pointing direction and pointing from the side where the second terminals are located to an opposite side is set as a second touch control inactive region, and an orthographic projection of the second touch control inactive region on the base substrate covers a region where the second fanout wires are located.

7. The light emitting substrate according to claim 1, wherein a region where the first fanout wires are located is set as a fanout region; and
   the electrode layer further comprises a plurality of first extension parts which are located in the fanout region, extend along the second direction and are in a one-to-one correspondence with the second touch control electrodes, and the first extension parts are connected with the second touch control electrodes through via holes penetrating the first insulating layer to prolong the second touch control electrodes.

8. The light emitting substrate according to claim 7, wherein the second wiring layer further comprises a plurality of second extension parts which are located in the fanout region, extend along the second direction and are in a one-to-one correspondence with the first extension parts, and the second extension parts are connected with the first extension parts through via holes penetrating the second insulating layer to prolong the second touch control electrodes.

9. The light emitting substrate according to claim 1, wherein the light emitting substrate comprises a plurality of light emitting units, at least one of the light emitting units is provided with the plurality of light emitting elements, and the plurality of light emitting elements of the same light emitting unit are connected in series through the connection signal wires.

10. A display device, comprising a light emitting substrate and a display panel located on a side of the light emitting substrate, wherein the light emitting substrate comprises: a base substrate, and an electrode layer, a first insulating layer, a first wiring layer, a second insulating layer, a second wiring layer and light emitting elements sequentially located on a side of the base substrate;

the electrode layer comprises: a plurality of first touch control electrodes extending along a first direction;

the first wiring layer comprises: a plurality of driving signal wires extending along a second direction and configured to drive the light emitting elements to emit light, and a plurality of second touch control electrodes extending along the second direction, wherein the second touch control electrodes are insulated from the first touch control electrodes, and the second direction intersects with the first direction; and the second wiring layer comprises: connection signal wires configured to connect different light emitting elements;

wherein the light emitting substrate further comprises first fanout wires in a one-to-one correspondence with the driving signal wires, one ends of the first fanout wires are connected with the driving signal wires, and the other ends of the first fanout wires are connected to first terminals; and the light emitting substrate further comprises second fanout wires in a one-to-one correspondence with the first touch control electrodes, and third fanout wires in a one-to-one correspondence with the second touch control electrodes, wherein one ends of the second fanout wires are connected with the first touch control electrodes, the other ends of the second fanout wires are connected to second terminals, one ends of the third fanout wires are connected with the second touch control electrodes, the other ends of the third fanout wires are connected to third terminals, and the second terminals and the third terminals are located on a same side of the base substrate;

wherein the first terminals and the second terminals are located on opposite sides of the base substrate; and a direction pointing from a side where the second terminals are located to a side where the first terminals are located is set as a first pointing direction, a region between a first piece of the first touch control electrodes and a second piece of the second touch control electrodes in the first pointing direction is set as a first touch control inactive region, and an orthographic projection of the first touch control inactive region on the base substrate covers a region where the third fanout wires are located.

11. A fabricating method for fabricating the light emitting substrate according to claim 1, wherein the fabricating method comprises:

providing the base substrate;

forming the electrode layer on a side of the base substrate through an electroplating process, wherein the electrode layer comprises the plurality of first touch control electrodes extending along the first direction;

forming the first insulating layer on a side of the first electrodes facing away from the base substrate through a patterning process;

forming the first wiring layer on a side of the first insulating layer facing away from the first touch control electrodes through the electroplating process, wherein the first wiring layer comprises: the plurality of driving signal wires extending along the second direction, and the plurality of second touch control electrodes extending along the second direction;

forming the second insulating layer on a side of the first wiring layer facing away from the first insulating layer through the patterning process; and forming the second wiring layer on a side of the second insulating layer facing away from the first wiring layer, wherein the second wiring layer comprises the connection signal wires configured to connect different light emitting elements.

12. The fabricating method according to claim 11, wherein forming the second wiring layer on the side of the second insulating layer facing away from the first wiring layer comprises:

forming the second wiring layer on the side of the second insulating layer facing away from the first wiring layer through processes of sputtering, cleaning, coating, baking, photoetching, developing, hard baking, etching, and stripping.

* * * * *